United States Patent
Yoshida et al.

(10) Patent No.: US 10,112,183 B2
(45) Date of Patent: Oct. 30, 2018

(54) CATALYST FOR PURIFYING COMBUSTION EXHAUST GAS, AND METHOD FOR PURIFYING COMBUSTION EXHAUST GAS

(71) Applicant: Hitachi Zosen Corporation, Osaka-shi (JP)

(72) Inventors: Satoshi Yoshida, Osaka (JP); Susumu Hikazudani, Osaka (JP); Kana Shimizu, Osaka (JP); Emi Shono, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 220 days.

(21) Appl. No.: 15/125,730

(22) PCT Filed: Mar. 23, 2015

(86) PCT No.: PCT/JP2015/058742
§ 371 (c)(1),
(2) Date: Sep. 13, 2016

(87) PCT Pub. No.: WO2015/146913
PCT Pub. Date: Oct. 1, 2015

(65) Prior Publication Data
US 2017/0001181 A1    Jan. 5, 2017

(30) Foreign Application Priority Data
Mar. 24, 2014    (JP) .................. 2014-060080

(51) Int. Cl.
*B01J 29/46* (2006.01)
*B01D 53/86* (2006.01)
(Continued)

(52) U.S. Cl.
CPC .......... *B01J 29/68* (2013.01); *B01D 53/9418* (2013.01); *B01J 23/75* (2013.01); *B01J 29/072* (2013.01);
(Continued)

(58) Field of Classification Search
CPC .......... B01D 53/9418; B01D 2251/208; B01D 2255/20746; B01J 23/00–37/0246; F01N 3/20; F01N 2370/04–2370/14
See application file for complete search history.

(56) References Cited

U.S. PATENT DOCUMENTS

| | | | | |
|---|---|---|---|---|
| 2012/0208691 A1* | 8/2012 | Bull | ................... | B01J 29/72 502/60 |
| 2014/0162867 A1* | 6/2014 | Lai | ................... | C01B 39/40 502/77 |
| 2016/0129431 A1* | 5/2016 | Bull | ................... | B01J 29/72 423/700 |

FOREIGN PATENT DOCUMENTS

| | | |
|---|---|---|
| CN | 101723404 A | 6/2010 |
| JP | 05-43221 A | 2/1993 |

(Continued)

OTHER PUBLICATIONS

Supplementary European Search Report dated Aug. 24, 2017, issued for the corresponding EP patent application No. 15769841.6.
(Continued)

*Primary Examiner* — Colleen P Dunn
(74) *Attorney, Agent, or Firm* — Locke Lord LLP (57) ABSTRACT

To provide a catalyst for purifying a combustion exhaust gas and a method for purifying a combustion exhaust gas. The denitration catalyst used in a method for purifying a combustion exhaust gas of removing a nitrogen oxide in the exhaust gas by making the catalyst into contact with the combustion exhaust gas having an alcohol as a reducing agent added thereto, contains zeolite as a support having
(Continued)

supported thereon a catalyst metal, in a powder X-ray diffraction (XRD) measurement of the denitration catalyst a ratio (relative peak intensity ratio) r=I/J of a height I of a diffraction peak at a diffraction angle (2θ) of from 7.8 to 10.0° and a height J of a diffraction peak at a diffraction angle (2θ) of from 28.0 to 31.0° being in a range of from 3.0 to 5.0.

5 Claims, 7 Drawing Sheets

(51) Int. Cl.
| | |
|---|---|
| *B01J 29/68* | (2006.01) |
| *B01J 37/08* | (2006.01) |
| *B01D 53/94* | (2006.01) |
| *B01J 29/072* | (2006.01) |
| *B01J 35/00* | (2006.01) |
| *B01J 23/75* | (2006.01) |
| *F01N 3/20* | (2006.01) |
| *B01J 37/02* | (2006.01) |

(52) U.S. Cl.
CPC ............ *B01J 29/46* (2013.01); *B01J 35/002* (2013.01); *B01J 35/0006* (2013.01); *F01N 3/20* (2013.01); *B01D 2251/208* (2013.01); *B01D 2255/20746* (2013.01); *B01D 2255/50* (2013.01); *B01D 2255/504* (2013.01); *B01J 37/0246* (2013.01); *B01J 2229/186* (2013.01); *B01J 2229/40* (2013.01); *F01N 2370/04* (2013.01); *F01N 2570/14* (2013.01); *Y02T 10/24* (2013.01)

(56) References Cited

FOREIGN PATENT DOCUMENTS

| | | |
|---|---|---|
| JP | 05-43222 A | 2/1993 |
| JP | 07-303820 | 5/1994 |
| JP | 10-033947 A | 2/1998 |
| JP | 2004-358454 A | 12/2004 |
| JP | 2006-220107 A | 8/2006 |
| JP | 2013-226545 A | 11/2013 |
| WO | 2014/088723 A1 | 6/2014 |

OTHER PUBLICATIONS

Ken Ogura et al., "Performance of Purification for Diesel Exhaust Gas over Cobalt Ion-exchanged ZSM-5 Catalyst", Catalyst, vol. 39, No. 2, 1997, p. 205 and a cover page.

International Search Report dated Jun. 16, 2015, issued for PCT/JP2015/058742.

\* cited by examiner

CATALYST FOR PURIFYING COMBUSTION EXHAUST GAS, AND METHOD FOR PURIFYING COMBUSTION EXHAUST GAS

TECHNICAL FIELD

The present invention relates to a catalyst for purifying a combustion exhaust gas and a method for purifying a combustion exhaust gas, for removing a nitrogen oxide (NOx) in a combustion exhaust gas discharged from an internal combustion engine, such as a marine diesel engine.

BACKGROUND ART

For removing a nitrogen oxide in a combustion exhaust gas of an internal combustion engine, such as a marine diesel engine, an ammonia selective catalytic reduction method is mainly used. The ammonia selective catalytic reduction method is such a method that a denitration catalyst containing vanadium and titania as a major component is used as a catalyst, and ammonia is used as a reducing agent.

However, in an internal combustion engine, such as a marine diesel engine, a C heavy oil or the like is combusted in the internal combustion engine, as different from an automobile diesel engine, and since a C heavy oil or the like contains a sulfur component, a sulfur oxide (SOx) is generated along with a nitrogen oxide (NOx) in the combustion exhaust gas. In the case where the combustion exhaust gas of this type is denitrated by an ammonia selective catalytic reduction method, a sulfur oxide and ammonia are reacted with each other in the combustion exhaust gas to form ammonium sulfate (($NH_4$)$_2$$SO_4$). Furthermore, in an internal combustion engine, such as a marine diesel engine, the temperature of the exhaust gas after passing through a supercharger becomes as low as approximately 250° C., and thus there may be a problem that ammonium sulfate formed through reaction of the sulfur oxide in the exhaust gas and ammonia as a reducing agent is deposited on the exhaust path, which causes clogging of the heat exchanger.

On the other hand, as a reductive removing method using a reducing agent other than ammonia, for example, PTL 1 shown below describes a method of using a catalyst containing a metal supported on zeolite and an alcohol as a reducing agent.

PTL 2 shown below describes that a denitration catalyst is disposed in an exhaust gas processing flow path that is branched into two paths, and while one of the exhaust gas processing flow path is closed to terminate the supply of the exhaust gas, whereas the exhaust gas processing is continued in the other of the exhaust gas processing path, the denitration catalyst layer of the exhaust gas processing path where the supply of the exhaust gas is terminated is heat-treated on the spot at a temperature of from 350 to 800° C., thereby recovering the deteriorated denitration capability thereof.

CITATION LIST

Patent Literatures

PTL 1: JP-A-2004-358454
PTL 2: JP-A-2006-220107

SUMMARY OF INVENTION

Technical Problem

However, the denitration catalyst described in PTL 1 requires a large amount of the reducing agent, and thereby the cost is unavoidably increased. Furthermore, there may be a problem that in the contact of the catalyst containing a metal supported on zeolite with an alcohol, a side reaction may occur in addition to the desired denitration reaction, a side reaction product due to the side reaction causes deposition of so-called coke (carbon) on the surface of the catalyst, which deteriorates the denitration capability with the lapse of time.

PTL 2 may have a problem that in the case where the amount of the reducing agent is large, a carbon compound and the like are accumulated on the catalyst with the lapse of time, which deteriorates the denitration capability.

An object of the invention is to solve the problems in the ordinary techniques, and to provide a catalyst for purifying a combustion exhaust gas and a method for purifying a combustion exhaust gas, in which in the removal of a nitrogen oxide from an exhaust gas in a relatively low temperature range discharged from an internal combustion engine, such as a marine diesel engine, the selectivity of an alcohol reducing agent to the denitration reaction is increased as compared to the ordinary technique, and thereby the denitration capability is enhanced with an amount of the reducing agent that is equivalent to the ordinary technique, thereby enabling the exhaust gas processing performed with a high efficiency.

Solution to Problem

As a result of earnest investigations made by the present inventors in view of the aforementioned issues, it has been found that the use of zeolite that has properties with a particular relative peak intensity ratio in an X-ray diffraction (XRD) analysis as a zeolite support used in a catalyst for purifying a combustion exhaust gas can enhance the denitration capability of the denitration catalyst as compared to the ordinary products, and thus the invention has been completed.

For achieving the objects, the invention of an initial embodiment is a denitration catalyst used in a method for purifying a combustion exhaust gas of removing a nitrogen oxide in the exhaust gas by making the catalyst into contact with the combustion exhaust gas having an alcohol as a reducing agent added thereto, the denitration catalyst containing zeolite as a support having supported thereon a catalyst metal, in a powder X-ray diffraction (XRD) measurement of the denitration catalyst a ratio (relative peak intensity ratio) $r=I/J$ of a height I of a diffraction peak at a diffraction angle ($2\theta$) of from 7.8 to 10.0° and a height J of a diffraction peak at a diffraction angle ($2\theta$) of from 28.0 to 31.0° being in a range of from 3.0 to 5.0.

The invention of a further embodiment is the catalyst for purifying a combustion exhaust gas according to the initial embodiment above, wherein the zeolite as a support contains zeolite that has been baked in an inert gas atmosphere in advance.

The invention is also the catalyst for purifying a combustion exhaust gas according to the initial embodiment above, wherein the catalyst metal is cobalt (Co).

The invention is also the catalyst for purifying a combustion exhaust gas according to said further embodiment above, wherein the catalyst metal is cobalt (Co).

The invention is also the catalyst for purifying a combustion exhaust gas according to the initial embodiment above, wherein the alcohol as a reducing agent is methanol or ethanol.

The invention is also a method for purifying a combustion exhaust gas, containing making a combustion exhaust gas having an alcohol as a reducing agent added thereto, into contact with a denitration catalyst containing a support containing zeolite that has been baked in an inert gas atmosphere in advance, having supported thereon a catalyst metal, in a powder X-ray diffraction (XRD) measurement of the denitration catalyst a ratio (relative peak intensity ratio) r=I/J of a height I of a diffraction peak at a diffraction angle (2θ) of from 7.8 to 10.0° and a height J of a diffraction peak at a diffraction angle (2θ) of from 28.0 to 31.0° being in a range of from 3.0 to 5.0, so as to remove a nitrogen oxide in the exhaust gas.

Advantageous Effects of Invention

According to the invention, such an effect is exerted that in the removal of a nitrogen oxide from an exhaust gas in a relatively low temperature range discharged from an internal combustion engine, such as a marine diesel engine, the selectivity of an alcohol reducing agent to the denitration reaction is increased, and thereby the denitration capability is enhanced with an amount of the reducing agent that is equivalent to the ordinary technique, thereby enabling the exhaust gas processing performed with a high efficiency.

DESCRIPTION OF EMBODIMENTS

Embodiments of the invention will be described below, but the invention is not limited thereto.

The catalyst for purifying a combustion exhaust gas of the invention is used for removing a nitrogen oxide (NOx) in a combustion exhaust gas discharged from an internal combustion engine, such as a diesel engine, an oil burning boiler, and a gas turbine.

The catalyst for purifying a combustion exhaust gas catalyst according to the invention contains zeolite as a support having supported thereon a catalyst metal, and in a powder X-ray diffraction (XRD) measurement of the denitration catalyst, the ratio (relative peak intensity ratio) r=I/J of the height I of the diffraction peak at a diffraction angle (2θ) of from 7.8 to 10.0° and the height J of the diffraction peak at a diffraction angle (2θ) of from 28.0 to 31.0° is in a range of from 3.0 to 5.0.

In the catalyst for purifying a combustion exhaust gas of the invention, the zeolite is not particularly limited as far as the denitration capability can be exhibited, but the use of zeolite having a structure having a high acid strength, such as MOR zeolite, requires a large amount of the reducing agent, and for exhibiting the denitration capability in a low temperature range around 200° C., the reducing agent is difficult to react with zeolite having a weak acid strength, such as β zeolite and Y zeolite. Accordingly, it is preferred to use MFI zeolite or FER zeolite, which has a structure that is relatively weaker in acid strength than MOR zeolite but is stronger in acid strength than β zeolite and Y zeolite.

In the catalyst for purifying a combustion exhaust gas according to the invention, the zeolite as a support preferably contains zeolite that has been baked in an inert gas atmosphere, such as nitrogen, in advance.

For removing a nitrogen oxide (NOx) from a combustion exhaust gas discharged, for example, from an internal combustion engine, such as a diesel engine, the exhaust gas is made into contact with the denitration catalyst of the invention containing zeolite having supported thereon a prescribed catalyst metal, in the presence of an alcohol as a reducing agent, so as to reduce and remove a nitrogen oxide in the exhaust gas.

In the catalyst for purifying a combustion exhaust gas according to the invention, there is a tendency that in a powder X-ray diffraction (XRD) measurement of the denitration catalyst, when the ratio (relative peak intensity ratio) r=I/J of the height I of the diffraction peak at a diffraction angle (2θ) of from 7.8 to 10.0° and the height J of the diffraction peak at a diffraction angle (2θ) of from 28.0 to 31.0° is larger, the amount of AlOH inside the zeolite framework as the acid sites of the zeolite is smaller, whereas when r=I/J is smaller, the amount of AlOH inside the zeolite framework is larger.

Accordingly, in the denitration catalyst of the invention, in which in a powder X-ray diffraction (XRD) measurement of the denitration catalyst, the ratio (relative peak intensity ratio) r=I/J of the height I of the diffraction peak at a diffraction angle (2θ) of from 7.8 to 10.0° and the height J of the diffraction peak at a diffraction angle (2θ) of from 28.0 to 31.0° is in a range of from 3.0 to 5.0, it is considered that the amount of the acid sites on the surface of the denitration catalyst becomes proper, and thereby the selectivity of an alcohol reducing agent is increased to enhance the denitration rate.

It is considered that a denitration catalyst that has properties with r=I/J smaller than the range of from 3.0 to 5.0 has an excessive amount of acid sites on the surface of the catalyst and a large amount of the alcohol reducing agent is consumed uselessly, which decreases the selectivity to lower the denitration rate, whereas a denitration catalyst that has properties with r=I/J exceeding the range of from 3.0 to 5.0 has a decreased amount of acid sites, which improves the selectivity of the alcohol reducing agent, but the reactivity thereof is decreased to lower the denitration rate.

In the catalyst for purifying a combustion exhaust gas of the invention, the catalyst metal supported on the zeolite is preferably cobalt (Co). Examples of a precursor compound thereof used include an inorganic acid salt (such as, a nitrate salt and a chloride) and an organic acid salt (such as an acetate salt). The supporting method of the catalyst metal may suffice to exhibit the denitration capability, and examples thereof include an ion exchange method and an impregnation supporting method. Examples of the ion exchange method include a method of suspending zeolite in an aqueous solution containing a precursor compound of cobalt (Co), taking out from the aqueous solution the zeolite having the catalyst metal bonded thereto through ion exchange, drying and then baking the zeolite.

In the catalyst for purifying a combustion exhaust gas of the invention, the alcohol as a reducing agent is not particularly limited as far as the alcohol has a reducing capability at the temperature in the reducing process of the combustion exhaust gas, and methanol and ethanol, which are alcohols having a small carbon number, are preferably used.

The shape of the catalyst for purifying a combustion exhaust gas of the invention may be arbitrarily selected depending on the reactor and the gas flowing conditions applied, for example, a granular shape, a pellet shape, a honeycomb shape, and a plate shape.

The method for purifying a combustion exhaust gas of the invention contains making a combustion exhaust gas having an alcohol added thereto as a reducing agent, into contact with a denitration catalyst containing a support containing zeolite that has been baked in an inert gas atmosphere in advance, having supported thereon a catalyst metal, in a powder X-ray diffraction (XRD) measurement of the denitration catalyst a ratio (relative peak intensity ratio) $r = I/J$ of a height I of a diffraction peak at a diffraction angle (2θ) of from 7.8 to 10.0° and a height J of a diffraction peak at a diffraction angle (2θθ) of from 28.0 to 31.0° being in a range of from 3.0 to 5.0, at a temperature of from 180 to 400° C., and preferably from 200 to 300° C., so as to remove a nitrogen oxide in the exhaust gas.

In the method for purifying a combustion exhaust gas of the invention, the reducing agent is preferably added to the combustion exhaust gas at a ratio of from 0.1 to 4, and more preferably from 1 to 4, in terms of concentration ratio of (reducing agent)/(NOx in the exhaust gas). The concentration ratio of (reducing agent)/(NOx in the exhaust gas) herein depends on the demanded denitration rate, and for example, in the case where the demanded denitration rate is 30% or less, the method can be achieved even with a concentration ratio of (reducing agent)/(NOx in the exhaust gas) of from 0.1 to 1.

According to the method for purifying a combustion exhaust gas of the invention, in the removal of a nitrogen oxide from an exhaust gas in a relatively low temperature range discharged from an internal combustion engine, such as a marine diesel engine, the selectivity of an alcohol reducing agent to the denitration reaction is increased, and thereby the denitration capability is enhanced with an amount of the reducing agent that is equivalent to the ordinary technique, thereby enabling the exhaust gas processing performed with a high efficiency.

EXAMPLE

Examples of the invention will be described along with comparative examples, but the invention is not limited to the examples.

Example 1

Preparation of Co/MFI Zeolite Catalyst

As the denitration catalyst for purifying a combustion exhaust gas of the invention, a catalyst containing MFI (ZSM-5) zeolite having supported thereon cobalt (Co) was produced.

Commercially available MFI zeolite (HSZ-830NHA, produced by Tosoh Corporation) was baked in a $N_2$ atmosphere at 650° C. for 12 hours. 10 g of the baked zeolite was placed in 200 mL of a 0.1 mol (M) aqueous solution of cobalt nitrate (produced by Kishida Chemical Co., Ltd.), and the mixture was stirred at a temperature of 80° C. for 12 hours or more, so as to perform ion exchange. After the ion exchange, the zeolite was filtered, rinsed with 440 mL of ion exchanged water, and then dried at 100° C. for 12 hours, thereby providing a denitration catalyst containing cobalt (Co)-ion exchanged zeolite.

The Co content of the denitration catalyst was obtained by an X-ray fluorescence analysis (XRF measurement), and thus the Co-supported amount was 0.5% by weight.

In the powder X-ray diffraction (XRD) measurement of the denitration catalyst, the ratio (relative peak intensity ratio) $r = I/J$ of the height I of the diffraction peak at a diffraction angle (2θ) of from 7.8 to 10.0° and the height J of the diffraction peak at a diffraction angle (2θ) of from 28.0 to 31.0° was measured, and thus r was 3.2.

The kind of the zeolite as a support, the baking condition, the Co content (% by weight) of the denitration catalyst, and the relative peak intensity ratio $r = I/J$ are shown in Table 1 below.

Examples 2 to 4

A denitration catalyst for purifying a combustion exhaust gas of the invention was produced in the same manner as in Example 1, provided that the following points were changed from Example 1. In Example 2, the baking condition for the commercially available MFI zeolite was 700° C. for 12 hours; in Example 3, the baking condition for the commercially available MFI zeolite was 700° C. for 24 hours; and in Example 4, the baking condition for the commercially available MFI zeolite was 700° C. for 36 hours.

The Co content of the denitration catalysts of Examples 2 to 4 was obtained, and in the powder X-ray diffraction (XRD) measurement (MultiFlex, a trade name, produced by Rigaku Corporation) of the denitration catalysts of Examples 2 to 4, the ratio (relative peak intensity ratio) $r = I/J$ of the height I of the diffraction peak at a diffraction angle (2θ) of from 7.8 to 10.0° and the height J of the diffraction peak at a diffraction angle (2θ) of from 28.0 to 31.0° was measured, in the same manner as in Example 1, and the results obtained are shown in Table 1 below along with the kind of the zeolite as a support and the baking condition.

Figure 1:
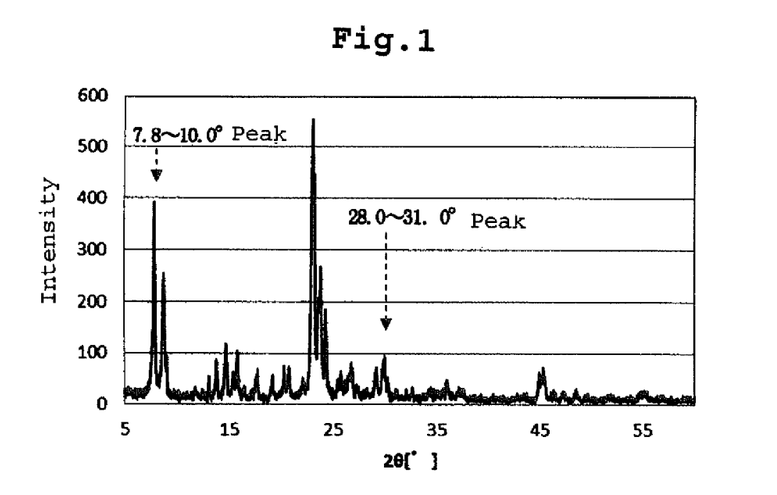
FIG. 1 is the powder X-ray diffraction (XRD) chart of the denitration catalyst obtained in Example 2 of the invention.

The powder X-ray diffraction (XRD) chart of the denitration catalyst for purifying a combustion exhaust gas obtained in Example 2 of the invention is shown in FIG. 1.

Example 5

A denitration catalyst for purifying a combustion exhaust gas of the invention was produced in the same manner as in Example 2, provided that the following points were changed from Example 2. A denitration catalyst containing Co/FER zeolite was produced and used by using commercially available ferrierite (FER) zeolite (HSZ-720NHA, a trade name, produced by Tosoh Corporation) as the zeolite.

The Co content of the denitration catalysts of Example 5 was obtained, and in the powder X-ray diffraction (XRD) measurement (Ultima IV, a trade name, produced by Rigaku Corporation) of the denitration catalyst of Example 5, the ratio (relative peak intensity ratio) $r = I/J$ of the height I of the diffraction peak at a diffraction angle (2θ) of from 7.8 to 10.0° and the height J of the diffraction peak at a diffraction angle (2θ) of from 28.0 to 31.0° was measured, in the same manner as in Example 1, and the results obtained are shown in Table 1 below along with the kind of the zeolite as a support and the baking condition.

Figure 2:
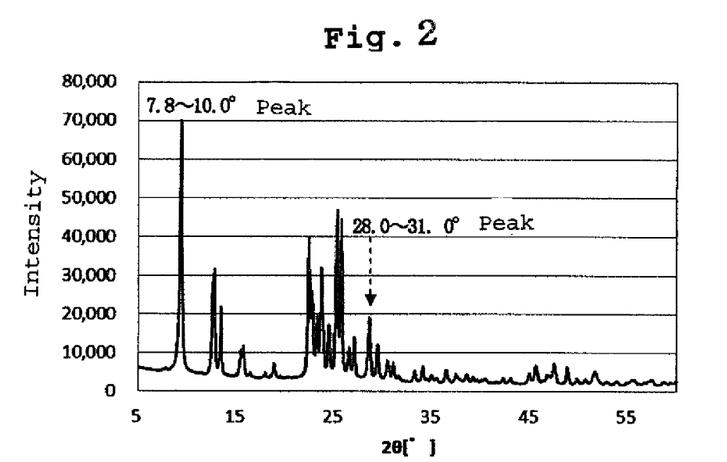
FIG. 2 is the powder X-ray diffraction (XRD) chart of the denitration catalyst obtained in Example 5 of the invention.

The powder X-ray diffraction (XRD) chart of the denitration catalyst for purifying a combustion exhaust gas obtained in Example 5 of the invention is shown in FIG. 2.

Comparative Example 1

For comparison, a denitration catalyst for purifying a combustion exhaust gas was produced in the same manner as in Example 1, provided that the following points were changed from Example 1. The commercially available MFI zeolite was not baked, and the unbaked MFI zeolite was used.

The Co content of the denitration catalyst of Comparative Example 1 was obtained, and in the powder X-ray diffraction (XRD) measurement (MultiFlex, a trade name, produced by Rigaku Corporation) of the denitration catalyst of Comparative Example 1, the ratio (relative peak intensity ratio) r=I/J of the height I of the diffraction peak at a diffraction angle (2θ) of from 7.8 to 10.0° and the height J of the diffraction peak at a diffraction angle (2θ) of from 28.0 to 31.0° was measured, in the same manner as in Example 1, and the results obtained are shown in Table 1 below along with the kind of the zeolite as a support and the baking condition.

Comparative Example 2

For comparison, a denitration catalyst for purifying a combustion exhaust gas was produced in the same manner as in Example 5, provided that the following points were changed from Example 5. The commercially available ferrierite (FER) zeolite was not baked, and the unbaked FER zeolite was used.

The Co content of the denitration catalyst of Comparative Example 2 was obtained, and in the powder X-ray diffraction (XRD) measurement (Ultima IV, a trade name, produced by Rigaku Corporation) of the denitration catalyst of Comparative Example 2, the ratio (relative peak intensity ratio) r=I/J of the height I of the diffraction peak at a diffraction angle (2θ) of from 7.8 to 10.0° and the height J of the diffraction peak at a diffraction angle (2θ) of from 28.0 to 31.0° was measured, in the same manner as in Example 1, and the results obtained are shown in Table 1 below along with the kind of the zeolite as a support and the baking condition.

Figure 3:
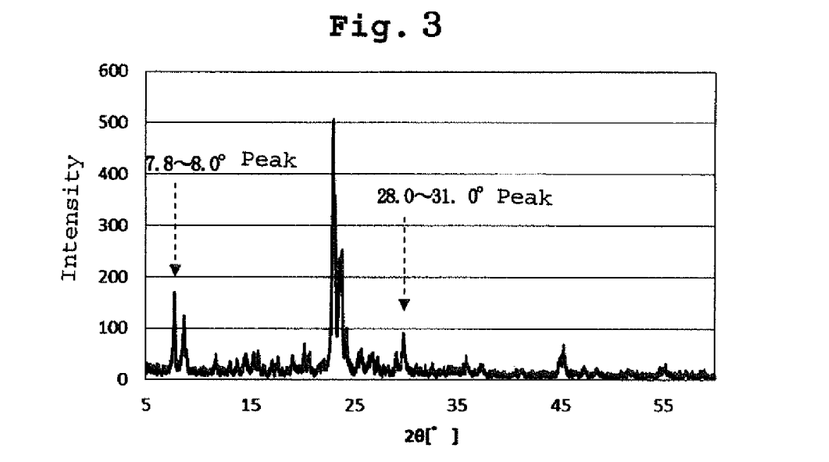
FIG. 3 is the powder X-ray diffraction (XRD) chart of the denitration catalyst obtained in Comparative Example 1.
Figure 4:
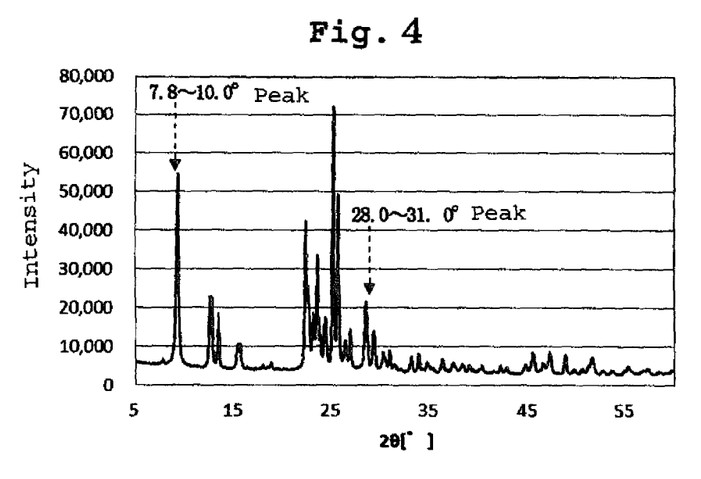
FIG. 4 is the powder X-ray diffraction (XRD) chart of the denitration catalyst obtained in Comparative Example 2.

The powder X-ray diffraction (XRD) charts of the denitration catalysts for purifying a combustion exhaust gas obtained in Comparative Example 1 and 2 are shown in FIGS. 3 and 4, respectively.

Comparative Examples 3 and 4

For comparison, a denitration catalyst for purifying a combustion exhaust gas was produced in the same manner as in Example 1, provided that the following points were changed from Example 1. In Comparative Example 3, the baking condition for the commercially available MFI zeolite was 600° C. for 12 hours; and in Comparative Example 4, the baking condition for the commercially available MFI zeolite was 800° C. for 12 hours.

The Co content of the denitration catalysts of Comparative Examples 3 and 4 was obtained, and in the powder X-ray diffraction (XRD) measurement (MultiFlex, a trade name, produced by Rigaku Corporation) of the denitration catalysts of Comparative Examples 3 and 4, the ratio (relative peak intensity ratio) r=I/J of the height I of the diffraction peak at a diffraction angle (2θ) of from 7.8 to 10.0° and the height J of the diffraction peak at a diffraction angle (2θ) of from 28.0 to 31.0° was measured, in the same manner as in Example 1, and the results obtained are shown in Table 1 below along with the kind of the zeolite as a support and the baking condition.

TABLE 1

| | Zeolite as support | Baking condition | $Co_2O_3$ (% by weight) | Denitration rate (%) | Relative peak intensity ratio r |
|---|---|---|---|---|---|
| Example 1 | MFI | 650° C., 12 h | 0.50 | 39 | 3.2 |
| Example 2 | MFI | 700° C., 12 h | 0.21 | 55 | 4.1 |
| Example 3 | MFI | 700° C., 24 h | 0.23 | 54 | 4.2 |
| Example 4 | MFI | 700° C., 36 h | 0.17 | 49 | 4.6 |
| Example 5 | FER | 700° C., 12 h | 0.11 | 66 | 3.7 |
| Comparative Example 1 | MFI | unbaked | 3.40 | 26 | 1.9 |
| Comparative Example 2 | FER | unbaked | 1.01 | 35 | 2.5 |
| Comparative Example 3 | MFI | 600° C., 12 h | 1.85 | 31 | 2.0 |
| Comparative Example 4 | MFI | 800° C., 12 h | 0.11 | 37 | 5.5 |

Figure 5:
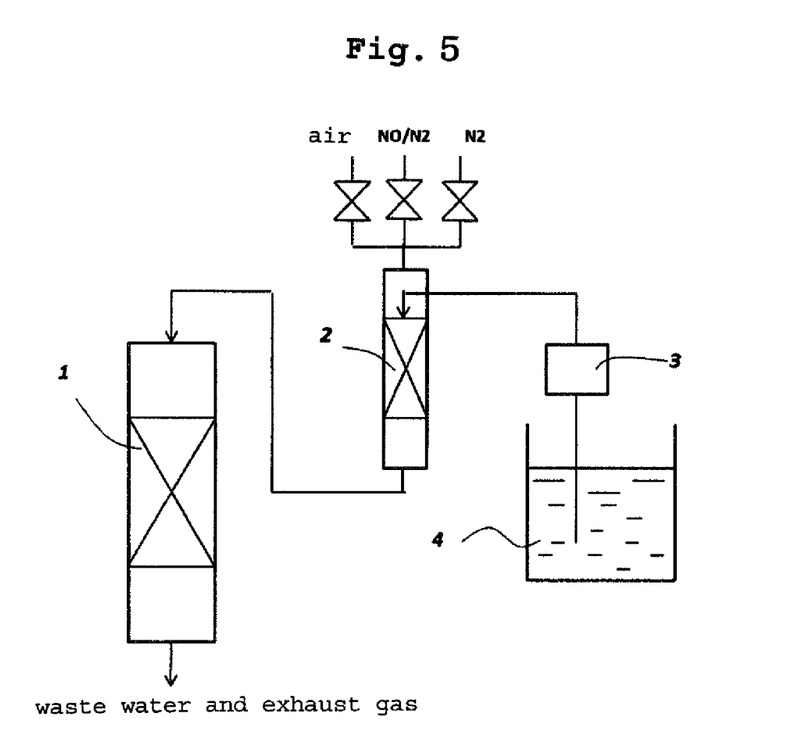
FIG. 5 is a flow diagram showing an example of the denitration rate measuring instrument used in the catalyst performance test in Examples of the invention.

A denitration catalyst performance evaluation test corresponding to a method for purifying a combustion exhaust gas was performed for the denitration catalysts of Examples 1 to 5 of the invention and Comparative Examples 1 to 4. FIG. 5 is the flow diagram of the performance evaluation test instrument for a denitration catalyst.

The catalyst formed of Co/MFI zeolite obtained above was press-molded, pulverized, and granulated to a mesh size between 26 and 16, so as to provide a pellet catalyst. In the test instrument having the flow diagram shown in FIG. 5, the catalyst was charged in a denitration reactor (1) formed of a stainless steel reaction tube having an inner diameter of 10.6 mm.

A gas for denitration test is introduced to the upper part of the denitration reactor (1) having the denitration catalyst charged therein, and the processed gas discharged from the lower part of the denitration reactor (1) is discharged to the exterior, a part of which is subjected to gas analysis.

The test gas introduced to the denitration reactor (1) is prepared by mixing the air, $N_2$ gas, and a $NO/N_2$ gas. The gas thus mixed is introduced to an upper end of an evaporator (2). An aqueous solution of an alcohol as a reducing agent is drawn from an alcohol aqueous solution tank (4) with a metering pump (3) and fed to a part close to the upper end of the evaporator (2). In the evaporator (2), the alcohol aqueous solution is evaporated by heating with a heater and fed to the denitration reactor (1) from the lower part of the evaporator (2) along with the $NO/N_2$ mixed gas. The denitration-processed gas discharged from the denitration reactor (1) after completing the process of denitration reaction at a temperature of 250° C. in the denitration reactor (1) is discharged to the exterior, a part of which is subjected to gas analysis.

An evaluation test was performed by using a test exhaust gas having a NO concentration of 1,000 ppm at a concentration ratio of (reducing agent)/(NO in the exhaust gas) of 2 by using methanol (MeOH) as a reducing agent at a concentration of 2,000 ppm under the test condition shown in Table 2 below.

TABLE 2

| | |
|---|---|
| Gas composition: NO | 1,000 ppmvd |
| Nitrogen concentration | Balance |
| Water vapor concentration | 5.0% by volume |
| Oxygen concentration | 14.0% by volume |
| Gas flow rate | 1 L/min |
| Amount of catalyst | 2 g |
| Space velocity | 30,000 L/h |
| Reaction temperature | 250° C. |

As the gas analysis at the outlet port of the reactor, the outlet port NOx concentration was measured by using a nitrogen oxide (NOx) meter. The denitration rate as the NOx removal capability of the catalyst was calculated from the measured value with the NOx meter according to the following expression (1).

$$\text{denitration rate (\%)} = (NOx_{in} - NOx_{out})/NOx_{in} \times 100 \quad (1)$$

The results of the evaluation test of the denitration catalyst capability are shown in Table 1.

Figure 6:
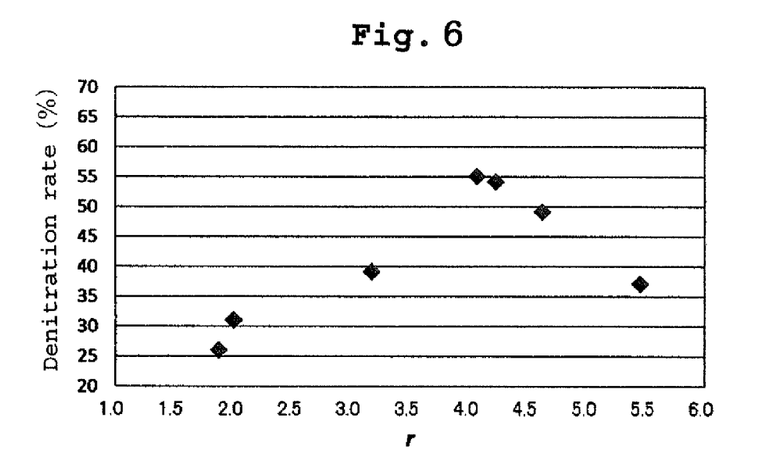
FIG. 6 is a graph showing the relationships between the relative peak intensity ratio r and the denitration rate for the denitration catalysts containing MFI (ZSM-5) zeolite having supported thereon cobalt (Co).
Figure 7:
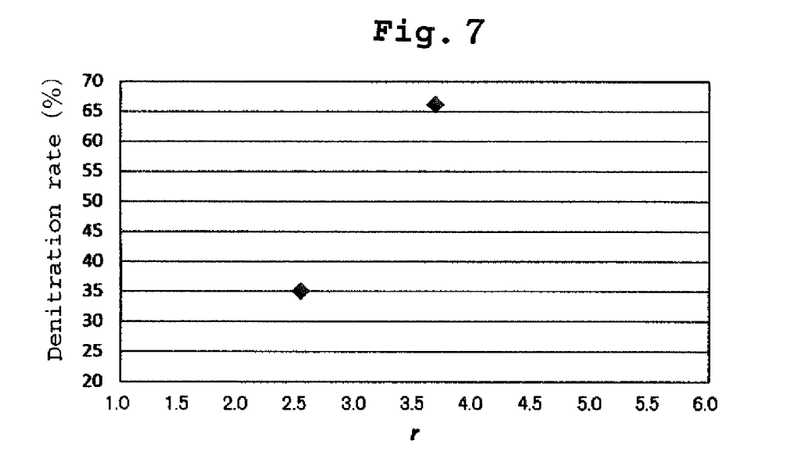
FIG. 7 is a graph showing the relationships between the relative peak intensity ratio r and the denitration rate for the denitration catalysts containing ferrierite (FER) zeolite having supported thereon cobalt (Co).

The relationships between the relative peak intensity ratio r in powder X-ray diffraction (XRD) and the denitration rate under the various baking conditions are shown in FIGS. 6 and 7. FIG. 6 shows the relationships between the relative peak intensity ratio r and the denitration rate for the denitration catalysts of Examples 1 to 4 containing MFI (ZSM-5) zeolite having supported thereon cobalt (Co) and the denitration catalysts of Comparative Examples 1, 3, and 4, and FIG. 7 shows the relationships between the relative peak intensity ratio r and the denitration rate for the denitration catalyst of Example 5 containing ferrierite (FER) zeolite having supported thereon cobalt (Co) and the denitration catalyst of Comparative Example 2.

In Table 1 and FIGS. 6 and 7, for ignoring the measurement deviation due to the powder X-ray diffraction (XRD) instrument, the relative peak intensity ratio r ((peak intensity I around 2θ of from 7.8 to 8.0°)/(peak intensity J at 2θ of from 28.0 to 31.0°) calculated by dividing the peak intensity at 2θ of from 7.8 to 8.0°, which was found to undergo changes, by the peak intensity at 2θ of from 28.0 to 31.0°, which was found to undergo substantially no change among the specimens, was used.

As apparent from Table 1 and FIGS. 6 and 7, it is understood that the denitration catalysts obtained in Examples 1 to 5 of the invention, in which in a powder X-ray diffraction (XRD) measurement of the denitration catalyst, the ratio r=I/J of the height I of the diffraction peak at a diffraction angle (2θ) of from 7.8 to 10.0° and the height J of the diffraction peak at a diffraction angle (2θ) of from 28.0 to 31.0° is in a range of from 3.0 to 5.0, have excellent denitration capability as compared to the denitration catalysts of Comparative Examples 1 to 4.

REFERENCE SIGN LIST 1 denitration reactor
2 evaporator
3 metering pump
4 alcohol aqueous solution tank

The invention claimed is:

1. A denitration catalyst used in a method for purifying a combustion exhaust gas of removing a nitrogen oxide in the exhaust gas by making the catalyst into contact with the combustion exhaust gas having an alcohol as a reducing agent added thereto, the denitration catalyst comprising zeolite as a support having supported thereon cobalt (Co) as a catalyst metal, in a powder X-ray diffraction measurement of the denitration catalyst a ratio r=I/J of a height I of a diffraction peak at a diffraction angle (2θ) of from 7.8 to 10.0° and a height J of a diffraction peak at a diffraction angle (2θ) of from 28.0 to 31.0° being in a range of from 3.0 to 5.0.

2. The catalyst for purifying a combustion exhaust gas according to claim 1, wherein the zeolite as a support contains zeolite that has been baked in an inert gas atmosphere in advance.

3. The catalyst for purifying a combustion exhaust gas according to claim 1, wherein the alcohol as a reducing agent is methanol or ethanol.

4. A method for purifying a combustion exhaust gas, comprising making a combustion exhaust gas having an alcohol as a reducing agent added thereto, into contact with a denitration catalyst containing a support containing zeolite that has been baked in an inert gas atmosphere in advance, having supported thereon cobalt (Co) as a catalyst metal, in a powder X-ray diffraction (XRD) measurement of the denitration catalyst a ratio r=I/J of a height I of a diffraction peak at a diffraction angle (2θ) of from 7.8 to 10.0° and a height J of a diffraction peak at a diffraction angle (2θ) of from 28.0 to 31.0° being in a range of from 3.0 to 5.0, so as to remove a nitrogen oxide in the exhaust gas.

5. The catalyst for purifying a combustion exhaust gas according to claim 2, wherein the alcohol as a reducing agent is methanol or ethanol.

* * * * *